(12) United States Patent
Brennan

(10) Patent No.: US 8,460,506 B1
(45) Date of Patent: Jun. 11, 2013

(54) COMPOSITIONS AND METHODS FOR ADHESION

(71) Applicant: Rory Brennan, Brattleboro, VT (US)

(72) Inventor: Rory Brennan, Brattleboro, VT (US)

(73) Assignee: Rory E. Brennan, Brattleboro, VT (US)

( * ) Notice: Subject to any disclaimer, the term of this patent is extended or adjusted under 35 U.S.C. 154(b) by 0 days.

(21) Appl. No.: 13/750,521

(22) Filed: Jan. 25, 2013

Related U.S. Application Data

(62) Division of application No. 11/461,651, filed on Aug. 1, 2006, now Pat. No. 8,362,135.

(60) Provisional application No. 60/704,625, filed on Aug. 2, 2005.

(51) Int. Cl.
*B32B 37/12* (2006.01)
*B32B 43/00* (2006.01)

(52) U.S. Cl.
USPC ............................................ 156/314; 156/94

(58) Field of Classification Search
USPC .................................................. 156/314, 94
See application file for complete search history.

(56) References Cited

U.S. PATENT DOCUMENTS 5,314,944 A * 5/1994 Chao ............................ 524/501

* cited by examiner

*Primary Examiner* — Satya Sastri
(74) *Attorney, Agent, or Firm* — Vorys, Sater, Seymour and Pease LLP; Susanne M. Hopkins

(57) ABSTRACT

Improved compositions for the restoration, repair and assembly of materials include (a) a conditioner composition including a polymer that matches or is substantially the same as that to which Chemical Abstracts registry number (CAS No.) 222414-16-6 is assigned (commercially available as RHOPLEX 1834 acrylic emulsion) and (b) an adhesive composition that also includes a polymer that matches or is substantially the same as that to which CAS No. 222414-16-6 is assigned. Adhesive composition can also include a polymer that matches or is substantially the same as that to which CAS No. 253351-13-2 (commercially available as RHOPLEX 1950 acrylic emulsion) is assigned. First, the conditioner composition is injected into a gap between the two structures to be adhered. Next, the adhesive composition is injected into the gap. In one embodiment, the compositions are used to restore and repair historic plaster ceilings and walls.

23 Claims, 6 Drawing Sheets

COMPOSITIONS AND METHODS FOR ADHESION

RELATED APPLICATION

This application is a Divisional of U.S. patent application Ser. No. 11/461,651, filed Aug. 1, 2006, now U.S. Pat. No. 8,362,135, which claims the benefit of U.S. Provisional Application No. 60/704,625, filed Aug. 2, 2005, the entire teachings of which are incorporated herein by reference.

BACKGROUND

Lime plasters have a history that spans thousands of years. Historically, lime was used to plaster floors at least as early as 9,000 B.C. Lime plaster was used in Imperial Rome, $13^{th}$-century England, $11^{th}$-century Mayan cities, Japan, Germany, India, Southeast Asia, Central America and Colonial America.

Ancient lime plasters, renders, stuccos, and washes formed of lime have lasted to this day through history giving building lime an exceptional track record. Lime lasts a long period of time, making it an excellent medium for long term repairs and maintenance.

SUMMARY

Described herein are improved compositions for the long term restoration and repair of lime plasters, as well as for other structures and materials, such as ceramics, wood, and stone. Also disclosed are methods for using those compositions in assembly and new construction, as these methods are not limited to restoration and repair procedures. Two surfaces are bonded using a two-step procedure, wherein a conditioner composition is applied and then an adhesive composition is applied to the surface. An advantage of embodiments of these compositions is that they are less toxic and more environmentally safe compared to other construction adhesives.

For example, a method for adhering a plaster composition to a structure, e.g., a support structure such as a wooden lath or masonry (such as brick, terra cotta blocks, cement blocks or stone), is carried out by administering, e.g., by applying, injecting, spraying, painting, a conditioner composition into a gap between the plaster and the support structure, the conditioner composition comprising a polymer having the Chemical Abstracts registry number (CAS No.) 222414-16-6 (such as the commercially available RHOPLEX 1834 acrylic emulsion, which includes 47±0.05% solids, and has a pH of 9.3-10.2, a density of about 8.8 lbs/gal at 25° C. and a glass-transition temperature of 13° C. from Rohm & Haas of Philadelphia, Pa., USA), or similar acrylic emulsion, and administering, e.g., by applying, injecting, spraying, painting, an adhesive composition into the gap, the adhesive composition comprising RHOPLEX 1834, or similar acrylic emulsion among other modifiers.

In some embodiments, the method further comprises creating ports (i.e., bores) in the plaster through which the conditioner composition and the adhesive composition are injected. The plaster is brought toward the support structure (before or after injection of the adhesive composition) such that the adhesive composition can penetrate both into the plaster and into the support structure; and the position of the plaster relative to the support structure is maintained by a fastener, e.g., a screw, passed through the plaster and into the support structure.

The composition of the conditioner includes a polymer-containing emulsion such as RHOPLEX 1834, or similar acrylic emulsion. In various embodiments, the conditioner also includes water and/or isopropanol. For example, the conditioner composition includes: approximately 45 volume-percent RHOPLEX 1834, or similar acrylic emulsion; approximately 45 volume-% water; and, approximately 10 volume-% isopropanol. The adhesive composition optionally includes a polymer having the Chemical Abstracts registry number (CAS No.) 253351-13-2 (such as the commercially available RHOPLEX 1950 acrylic emulsion, which is about 63% solids, has a pH of about 5.0, a viscosity of about 150 cps at 25° C., a density of about 8.7 lb/gal at 25° C., and a glass-transition temperature of about −50° C., and which is also from Rohm & Haas of Philadelphia, Pa., USA), or similar acrylic emulsion. For example, the adhesive composition for use with plaster, metal and glass includes an adhesive foundation containing• approximately 60 volume-percent RHOPLEX 1834, or similar acrylic emulsion; and, approximately 40 volume-percent RHOPLEX 1950, or similar acrylic emulsion.

In another embodiment, a more-rigid adhesive for use in bonding ceramic tile includes RHOPLEX 1834, or similar acrylic emulsion, and RHOPLEX 1950, or similar acrylic emulsion, at a ratio of approximately 2 parts RHOPLEX 1834, or similar acrylic emulsion, and 1 part RHOPLEX 1950, or similar acrylic emulsion; this more-rigid formulation (2:1) is suitable in this context because ceramic tile applied to cement board has very little flexibility. The ratio can be increased to 90-100 volume-percent RHOPLEX 1834, or similar acrylic emulsion; and, 10-0 volume-percent RHOPLEX 1950, or similar acrylic emulsion, to make it less flexible if the situation calls for it. In yet another embodiment, the ratio of RHOPLEX 1834, or similar acrylic emulsion, and RHOPLEX 1950, or similar acrylic emulsion, is approximately 2:3. In a highly flexible embodiment that can be used, e.g., to bond wood structures, the ratio of RHOPLEX 1834, or similar acrylic emulsion to RHOPLEX 1950, or similar acrylic emulsion, is approximately 1:2; the bonding of wood to wood requires this increased flexibility to accommodate the natural flexibility and movement of wood.

The method includes a step of adding a thickener composition to the adhesive foundation to form the adhesive composition, the adhesive composition having a viscosity that is higher than that of the adhesive foundation. For example, the thickener composition and the adhesive foundation are mixed at concentrations in the following ranges: approximately 80 to 85 volume-% base adhesive composition; and, approximately 15 to 20 volume-% thickener composition. The thickener serves an important function in this adhesive system. On its own, the thickener is a high-viscosity material (i.e., a thick gel). Added to the mixture of acrylic emulsions, the thickener allows the mixed adhesive to function with two different viscosities. When at rest (subjected to low shear rates), the adhesive has high viscosity similar to that of shaving cream. When injected under pressure (high shear rates), the adhesive will flow easily, demonstrating low viscosity. This property (referred to as thixotropy) is of great advantage in vertical applications.

In a method of adhering a plaster or other substrate to a support structure, a conditioner is injected and allowed to set for 2, 5, 10, 15, 20, 30 minutes depending upon conditions (e.g., as temperature drops or as humidity rises, the conditioner can be allowed to set for a longer period of time); and then no later than ½ hour after the injection of the conditioner, the adhesive is applied. In one embodiment, the adhesive composition is delivered to the surfaces 10 minutes after the delivery of the conditioner composition. These techniques likewise apply to many other adhesive applications, including but not limited to new assemblies, new and existing construction, restoration, and repair.

Also disclosed is an adhesive foundation. For example, the adhesive foundation in this embodiment includes approximately 60 volume-% RHOPLEX 1834, or similar acrylic emulsion; and, approximately 40 volume-% RHOPLEX 1950, or similar acrylic emulsion. In another example, the adhesive composition contains: an adhesive foundation including approximately 60 volume-% RHOPLEX 1834, or similar acrylic emulsion and approximately 40 volume-% RHOPLEX 1950 or similar acrylic emulsion; and a thickener composition including approximately 16.8 volume-% of a polymer having the Chemical Abstracts registry number (CAS No.) 37325-11-4 (such as that known as ACRYSOL ASE-60 thickener, which includes 28% solids, and has a pH of 3.5, a specific gravity of 1.054 at 25° C., a viscosity of 10 mPa·s, and a glass-transition temperature of 13° C. from Rohm & Haas of Philadelphia, Pa., USA), or similar acrylic emulsion; and, approximately 81.9 volume-% water; and a weak or strong base in sufficient quantities to ensure the transformation of the ASE-60, or similar acrylic emulsion/water mixture into the "thickener gel". In particular embodiments, the base can be ammonium hydroxide, potassium hydroxide, or morpholine ($C_4H_9NO$, CAS No. 110-91-8) at approximately 1 volume-% or less in the adhesive. In the formulation described above, the adhesive composition includes: approximately 80 to 85 volume-% adhesive foundation; and, approximately 15 to 20 volume-% thickener composition.

A kit for adhesive use contains the following items and/or compositions:
a) a first container containing a conditioner composition, the conditioner composition including:
  i) approximately 45 volume-% RHOPLEX 1834, or similar, acrylic emulsion;
  ii) approximately 45 volume-% water; and
  iii) approximately 10 volume-% isopropanol,
b) the second container containing an adhesive composition, the adhesive composition including:
  i) an adhesive foundation including:
    a) approximately 60 volume-% RHOPLEX 1834, or similar, acrylic emulsion; and
    b) approximately 40 volume-% RHOPLEX 1950, or similar, acrylic emulsion; and
  ii) a thickener composition including:
    a) approximately 16.8 volume-% ACRYSOL ASE-60, or similar acrylic emulsion, thickener; and
    b) approximately 81.9 volume-% water; and
    c) a weak or strong base in sufficient quantities to ensure the transformation of the ASE-60, or similar acrylic emulsion/water mixture, into the "thickener gel" added to the adhesive foundation at a volume of approximately 15%-20% of the adhesive foundation.

A variety of advantages can be obtained via use of the compositions and methods described herein. The adhesive composition after setting is water resistant and provides a deep, strong bond between surfaces, even when used to bond dirty, gritty and/or friable surfaces, i.e., under conditions where many other types of adhesives are ineffective. The set adhesive composition remains flexible under cold conditions and maintains its structure and adhesion of the surfaces on a near-permanent basis in warm conditions. The use of the conditioner (primer) enhances the ability of the adhesive to bond in unfavorable circumstances, such as uneven or dirty surfaces, described above.

DETAILED DESCRIPTION

Figure 1:
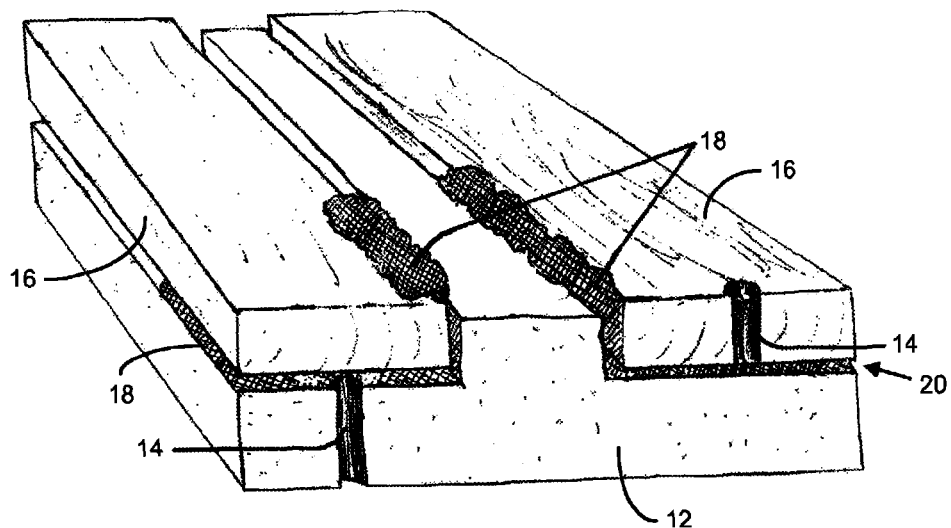
FIG. 1 shows the stabilization of historic plaster.

Specifically described in the foregoing text are methods for repairing, restoring, and preserving the integrity of historical and ornamental plasters, such as lime plasters, gypsum plaster, and Portland cement plaster, as well as additional structures and materials. These methods can likewise be used for new assembly, wherein original structures are constructed from newly manufactured materials. Additional materials that can be bonded via these methods include ceramic tile, vinyl tile, linoleum tile, wood, stone, leather, paper, metal, glass, terra cotta, brick, natural or synthetic fibers, fabric, foam, (such as foam made of polyurethane, polystyrene, or similar material), etc., and for other general repair or new assembly. The following description is particularly focused on the example of repairing lime plasters, though the same techniques are to be used with the repair and assembly of other materials.

Lime plasters have properties that make them excellent candidates for repair. Because lime crystallizes over an extended time frame, lime plasters are considered young at 100 years, and plaster may have had many decades to cure before repair is carried out. Additionally, lime plaster is flexible (relative to gypsum plaster or Portland cement plaster) and resistant to water damage. On exteriors, the outer-most layer is considered a sacrificial layer and is maintained with regular lime washes or treatment with limewater. With maintenance, historic plaster can last forever.

In either an interior or exterior repair context, an important factor is the compatibility of materials and building systems. This compatibility between the original material and the repair material is particularly important in an extreme environment. When the interior of the building has a wide range of environmental changes, e.g., humidity or temperature fluctuations, the compatibility issue becomes critical.

When in-kind replacements are the appropriate method of plaster repair, the repair material should have the same hardness, or be softer than the historic fabric, so that any loss of material comes from the repair and not from the original fabric.

Limestone is burned in a kiln to form quicklime (CaO) and then hydrated to form lime putty (building lime) [$Ca(OH)_2$].

The building lime is then allowed to cure by exposure to $CO_2$ (e.g., atmospheric) to form calcium carbonate ($CaCO_3$). Building limes are used to fabricate lime plasters, mortars, and washes.

The conservation of historic plasters is accomplished through the application of consolidates to friable areas and/or adhesive reattachment by injecting the conditioner and adhesive compositions between the plaster and its lath.

This lime plaster restoration procedure is determined, e.g., by the amount of separation of plaster from laths in the interior or exterior of a dwelling or other structure. If the plaster forms the ceiling of a room, and if the plaster separates from laths over time, then the plaster is likely to crack and sag, thereby causing the ceiling to droop downward. This phenomenon can occur with wall surfaces as well.

Figure 4:
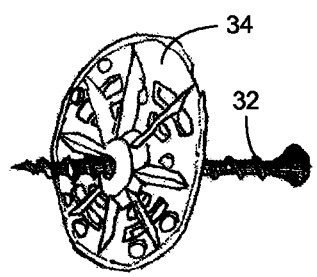
FIG. 4 shows a screw and a washer used to bring the plaster into contact with the lath.
Figure 6:
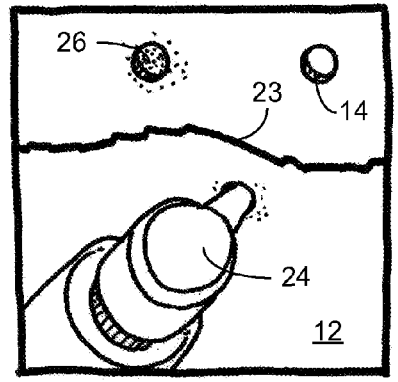
FIG. 6 shows the delivery of conditioner composition through the ports.

The stabilization of historic plaster 12, as shown in FIG. 1, includes the following four stages: (1) drilling injection ports 14 through the plaster 12 or through the wood laths 16 and inspecting the gap between the plaster 12 and the laths 16; (2) injecting a conditioner composition from a sprayer 24 (as shown in FIG. 6) into the gap 20 between the plaster 12 and the laths 16, priming both surfaces; (3) injecting an adhesive composition 18 into the gap 20; and, (4) bringing the plaster 12 back toward the laths 16, e.g., by clamping the plaster 12 to the laths 16 (using the screws 32 and washers 34 of FIG. 4) and tightening to insure "soft" contact between the adhesive composition 18, the plaster 12, and the lath 16. In one embodiment, the steps are performed in the order listed above; alternatively, plaster 12 can be clamped before the injection of the conditioner composition and before the adhesive composition is applied into the gap 20.

Figure 2:
FIG. 2 shows a masonry bit for drilling into the plaster.
Figure 3:
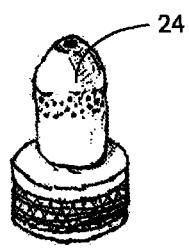
FIG. 3 shows a dispersal device for delivering the conditioner composition.
Figure 5:
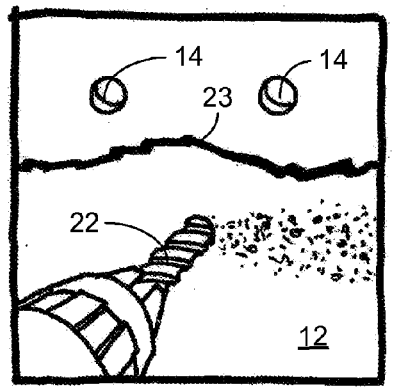
FIG. 5 shows the drilling of injection ports through the plaster.

In stage (1), identified above (and illustrated in FIG. 5), injection ports (holes) 14 are drilled through the plaster 12 with a 3/16-inch masonry bit 22 (illustrated in FIGS. 2 and 5); the ports 14 can have, e.g., a diameter of 3/16 inches (4.8 mm). A measuring device or other object (e.g., an awl, or a screwdriver) can then be inserted through a port 14, and one can measure the distance it travels before striking the lath and thereby gauge the size of the gap between the plaster and the lath. When selecting drilling sites for a vertical wall crack or a ceiling crack, one can commence by drilling 1.5 to 2 inches (approximately 3.8 to approximately 5.1 cm) away from the crack, every other lath or spaced approximately 2.75 to 3 inches (approximately 7.0 to approximately 7.6 cm) apart vertically (or laterally on a ceiling) along the entire length of the crack 23. More or fewer injection sites can be used, depending on the severity of displacement. At greater distances of displacement between the two surfaces, a greater number of injection ports are used; i.e., the degree of displacement is directly correlated with the number of injection ports.

In stage (2), shown in FIG. 6, a conditioner composition 26 is delivered, e.g., by injection, through the ports using a dispersal device 24, e.g., a high-quality garden sprayer, to consolidate the fine dust and dirt found on the surfaces to be adhered. The conditioner composition 26 comprises the following ingredients:
  (a) approximately 45 volume-% RHOPLEX 1834, or similar acrylic emulsion; and
  (b) approximately 45 volume-% water; and
  (c) approximately 10 volume-% isopropanol (99%).

"Similar" acrylic emulsions for use in the conditioner (and adhesive) composition will promote conditioning (and adhesive) properties similar to (or substantially the same as) those promoted by the RHOPLEX 1834 acrylic emulsion. Compositions that are substantially the same can also share the same chemical constituents as RHOPLEX 1834 acrylic emulsion, have the same polymer type, include approximately the same solids content, have approximately the same viscosity, and/or have approximately the same glass transition temperature. On the other hand, one example of a difference in a polymer that is nevertheless "substantially the same" can be, e.g., in polymer chain length. For example, the acrylic emulsion can be various copolymers formed from a mixture of monomers comprising at least two monomers selected from ($C_1$ to $C_8$) alkyl(meth)acrylates, (meth)acrylic acid, and styrene, as described in U.S. Pat. No. 6,423,805, which is incorporated herein by reference in its entirety. References herein to other emulsions and polymers that are "substantially the same as" recited commercial products and polymers having particular CAS numbers likewise share common properties, such as those noted above (including +/−20% variance of the physical properties, such as adhesive strength, of the referenced compositions, such as RHOPLEX 1834 or 1950 acrylic emulsions).

The conditioner composition 26 prepares the surfaces of the plaster 12 and the laths 16 (e.g., by consolidating dirt and grit and by reducing friability of the matrices at the surfaces) to allow the adhesive composition (in stage 3) to better grip both surfaces and to draw acrylic chains into the matrices of the plaster and lath surfaces, thereby promoting a deep bond.

Figure 7:
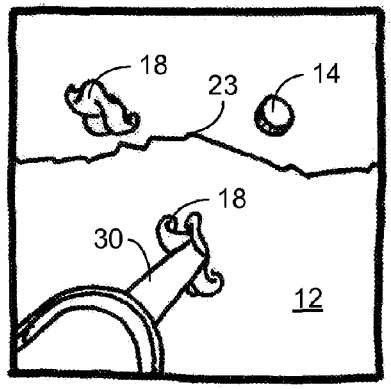
FIG. 7 shows the injection of adhesive composition into the ports.

In stage (3), illustrated in FIG. 7, an adhesive composition 18, which includes an adhesive foundation thickened with a thickener composition, is injected into the ports 14 ten minutes after the injection of the conditioner composition in stage (2). An embodiment of the adhesive foundation comprises the following ingredients:
  (a) approximately 60 volume-% RHOPLEX 1834 or similar acrylic emulsion; and
  (b) approximately 40 volume-% RHOPLEX 1950 or similar acrylic emulsion.

In the adhesive composition, the RHOPLEX 1834, or similar, acrylic emulsion is comparatively more rigid than the RHOPLEX 1950, or similar, acrylic emulsion. Accordingly, increasing concentrations of the less-rigid RHOPLEX 1950, or similar, emulsion increases the flexibility of the adhesive composition, thereby improving the flexible bonding capability of the adhesive composition. The adhesive composition initially is milky white, though it dries to a translucent, e.g., "water white" appearance. RHOPLEX 1950 emulsion (binder) is described in U.S. Pat. No. 6,613,832, which is incorporated herein by reference in its entirety.

Before use, the adhesive foundation is mixed with a thickener composition at an approximate ratio, e.g., of 80 to 85% adhesive foundation to 15 to 20 volume-% thickener composition. An embodiment of the thickener composition comprises the following ingredients:
  (a) approximately 16.8 volume-% ACRYSOL ASE-60, or similar acrylic emulsion, thickener (an acid-containing acrylic emulsion copolymer);
  (b) approximately 81.9 volume-% water; and
  (c) a weak or strong base in sufficient quantities to ensure the transformation of the ASE-60, or similar acrylic emulsion/water mixture into the "thickener gel."

The ACRYSOL ASE-60, or similar acrylic emulsion, thickener is alkali-activated so when the base is added, the thickener composition takes the form of a gel that can serve as a thickener when combined with the adhesive foundation.

After the adhesive foundation and the thickener are mixed to form the adhesive composition 18 to the approximate viscosity of shaving cream, the adhesive composition 18 can be injected through the ports 14 in the plaster 12 using a caulk gun 30 or other delivery device, employing approximately one handle squeeze of the gun 30 per port 14 (or approximately 0.5 ounce adhesive per injection site). The adhesive composition 18 flows from the caulk gun 30 under pressure into the gap 20 between the plaster 12 and the lath 16 and then stays in place. Both the conditioner composition and adhesive composition penetrate up to 1, 2, 5, 10, 20 or 50 mm into the surfaces to be bonded. The conditioner composition can be applied at a pressure, e.g., of 10, 25, or 50 pounds per square inch, while the adhesive composition can be applied at a pressure, e.g. 1 of 25, 50 or 100 pounds per square inch.

Use of the conditioner composition and use of the waterborne acrylics in the adhesive composition allow for the formation of a soft bond shoulder (i.e., without a sharply defined border for acrylic penetration into the surfaces). For comparison, when traditional epoxies are used as consolidants, the epoxies cure in a manner that allows them to soak into the porous surfaces developing a "hard" or well-defined shoulder. This shoulder often becomes an area of future failure. In contrast, water borne acrylics, such as those described herein, cure (coalesce) via water evaporation leaving a less-defined, flexible edge, which is less prone to being a source of future fracture. Other chemistries, such as epoxies compounded to be soft, urethanes, and silicones, yield excellent results as well. Acrylics are our method of choice; the acrylics are pulled along, penetrating deeper into the plaster and wood/masonry lath matrices, with the water. Because the speeds of penetration and evaporation are slow, a diffuse border is formed between the areas of no acrylic and the areas completely filled with acrylic (i.e., there is a gradual change in acrylic concentration as one enters deeper into the structures to be bonded). Unlike "film" adhesives, the acrylic conditioner/adhesive compositions described herein penetrates to a substantial depth into the plaster and wood/masonry lath matrices (e.g., up to 1/16 inch, 1/8 inch or even 1/4 inch), depending on the porosity of the matrices and on the amount of material applied.

The porosity of the materials being "glued together" has a direct effect on the degree to which the conditioner and adhesive penetrates the two surfaces. This adhesive coalesces by releasing water into the porous structure of the material and thereby evaporates. The greater the three-dimensional texture and porosity of a material, the greater the surface area for adhesion, and the more pores the adhesive can penetrate. Wood, pottery, and ceramic tiles are excellent examples of porous surfaces where the adhesive is able to form a deep, penetrating purchase. In particular embodiments, at least one of the materials to be bonded is porous. For example, as smooth as glass tiles are, they can be bonded to a porous material.

Figure 8:
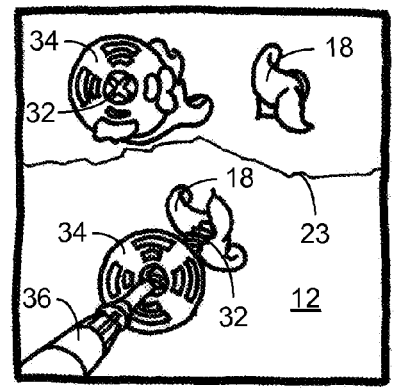
FIG. 8 shows the temporary clamping of the plaster into soft contact with the laths.

In stage (4), shown in FIG. 8, the plaster 12 is temporarily clamped into soft contact with the laths via screws inserted through 2-inch plastic washers 34 and then through the ports 14 in the plaster 12 and then to the laths, into which they are screwed, e.g., with a hand or power screwdriver 36. The screws 32 are tightened until the plaster is drawn to a distance from the laths within the tolerance of the thickened acrylic-emulsion adhesive composition 18 (as much as 3/16 inch, preferably 1/32 to 1/16 inch) to adhere to and penetrate into both surfaces. As previously noted, stage (4) can be performed either before or after injection of the conditioner composition and injection of the adhesive composition into the gap between the plaster and the laths.

Figure 9:
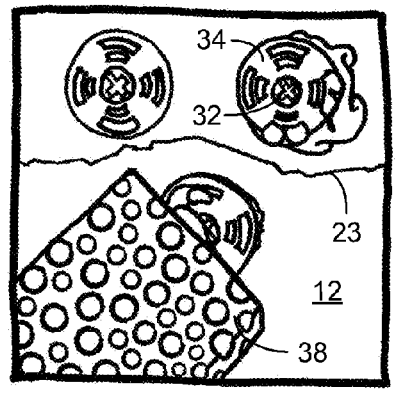
FIG. 9 shows the cleaning of exposed surfaces after the adhesion.

Finally, exposed surfaces can be cleaned with warm water and a soft sponge, 38 (as shown in FIG. 9). The adhesive is allowed to cure for a minimum of 24 hours. The washers or braces are then removed. Dried adhesive can be removed with a putty knife or metal window scraper. Drill holes and cracks can be filled with a material, such as plaster or joint compound.

The repair adhesive for plaster must be able to bond in difficult circumstances because the conditions encountered in re-establishing the bond between historic plaster and lath are adverse. These properties make the adhesive well suited for any type of adhesive task. In easy-to-bond circumstances it will function particularly well and outperform others. Whether easy or difficult conditions exist for bonding, the adhesive composition bonds by penetrating the matrices and consolidating the surfaces, thus allowing the adhesive to achieve complete attachment.

In addition to the use of these compositions and methods for adhering plaster to wood lath, brick or terra cotta block the compositions and methods can similarly be used to repair like materials, as well as to adhere different materials to each other (both structural and non-structural), such as plaster to plaster, wood to wood, glass to glass, metal to metal, plaster to wood, synthetic tile to plywood, ceramic tile to drywall, glass tile to cement board, metal to plaster, and wood to metal, foam to foam, foam to wood, foam to metal, foam to glass, fabric to fabric, fabric to most any other porous material, as well as many other unlike material uses.

In another application, where the adhesive is used to bond ceramic tile to a substrate, such as cement, the surfaces of the tile and substrate to be bonded are first cleaned. The conditioner composition is then applied (e.g., sprayed) onto both surfaces. After a ten-minute set time, (whereby the conditioner penetrates or soaks into the substrate), an even layer of the adhesive composition is spread using a 1/8-inch notched spreader on one surface. The tile is then set in place on the substrate and secured in place. The exposed surface of the tile and the surrounding area can then be cleaned with warm water and a soft sponge. The adhesive is then allowed to cure for at least 24 hours. If the tile is installed on a floor, a 72-hour cure should be provided to afford full strength of the bond. Because the adhesive is water-based, a longer setting period may be needed for particularly large or less porous tiles. After the adhesive has set, grout can be filled around the edges of the tile, as desired.

In another embodiment, where a wood bond is repaired, the surfaces to be bonded are again cleaned first. The conditioner is sprayed or brushed onto both surfaces. After a ten-minute set time, a thin layer (e.g., approximately 1/16-inch thick) of adhesive is applied to one surface. The two surfaces are then clamped or braced into soft contact (e.g., with mechanical fasteners or adjustable straps). The exposed surfaces can then be cleaned with warm water and a soft sponge, and the bond is allowed to cure for 24 hours.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A method for adhering a first structure to a second structure, the method comprising:

applying a conditioner composition to surfaces of the first structure and the second structure, the conditioner composition, comprising
    a first conditioner acrylic polymer emulsion having a solids content of 47.0±0.5%, a pH when packed of 9.3 to 10.2, a density of about 8.8 lbs/gal at 25° C., a specific gravity of 1.059, and a glass transition temperature of 13° C.,
    water, and
    isopropanol; and
applying an adhesive composition to the surfaces, the adhesive composition, comprising
    an adhesive foundation comprising a first adhesive acrylic polymer emulsion the same as or different from the first conditioner acrylic polymer emulsion, and having a solids content of 47.0±0.5%, a pH when packed of 9.3 to 10.2, a density of about 8.8 lbs/gal at 25° C., a specific gravity of 1.059, and a glass transition temperature of 13° C.; and a second adhesive acrylic polymer emulsion having a solids content of 63.0%, a pH of 5.0, a viscosity at 25° C. of 150 cps, a density of about 8.7 lbs/gal at 25° C., and a glass transition temperature of −50° C.,
    a thickener composition comprising a third thickener acrylic anionic copolymer emulsion having a solids content of 28.0%, a pH of 3.5, a Brookfield Viscosity RVT, 12 rmp of 10 mPa·s, and a specific gravity of 1.054 at 25° C., and water, and
    a base; and
allowing the surfaces to bond.

Figure 10:
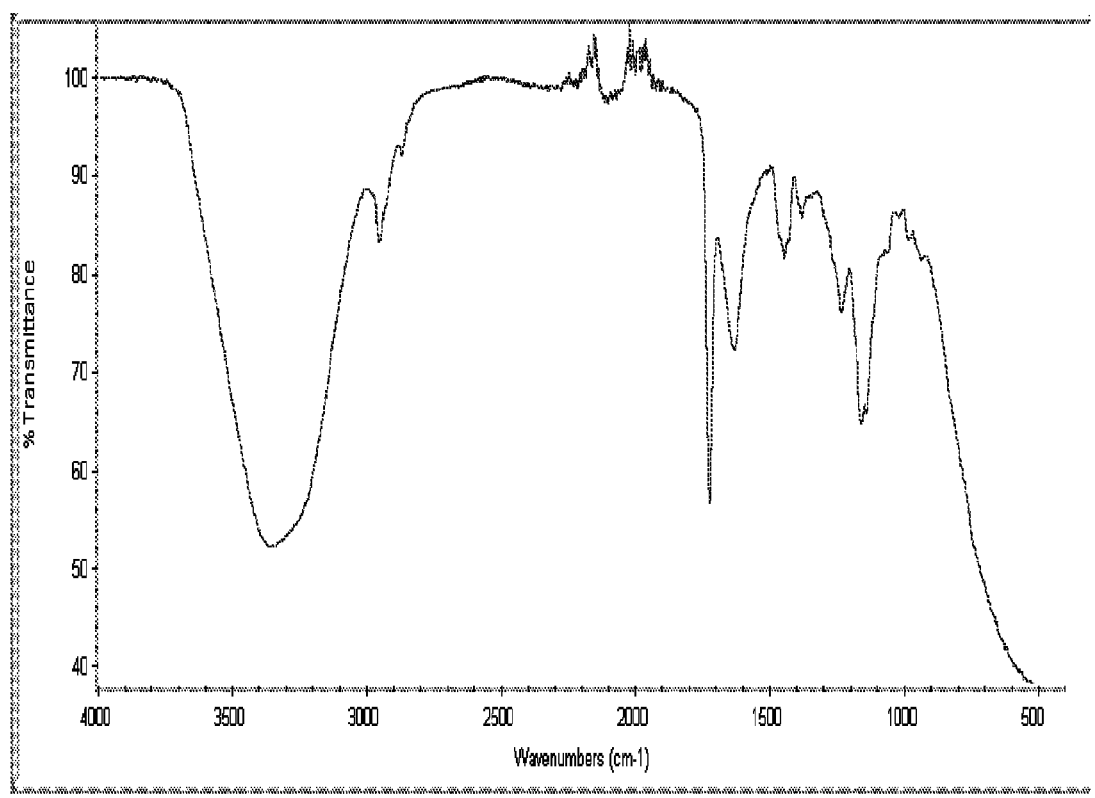
FIG. 10 shows the infrared spectrum for RHOPLEX 1834.
Figure 11:
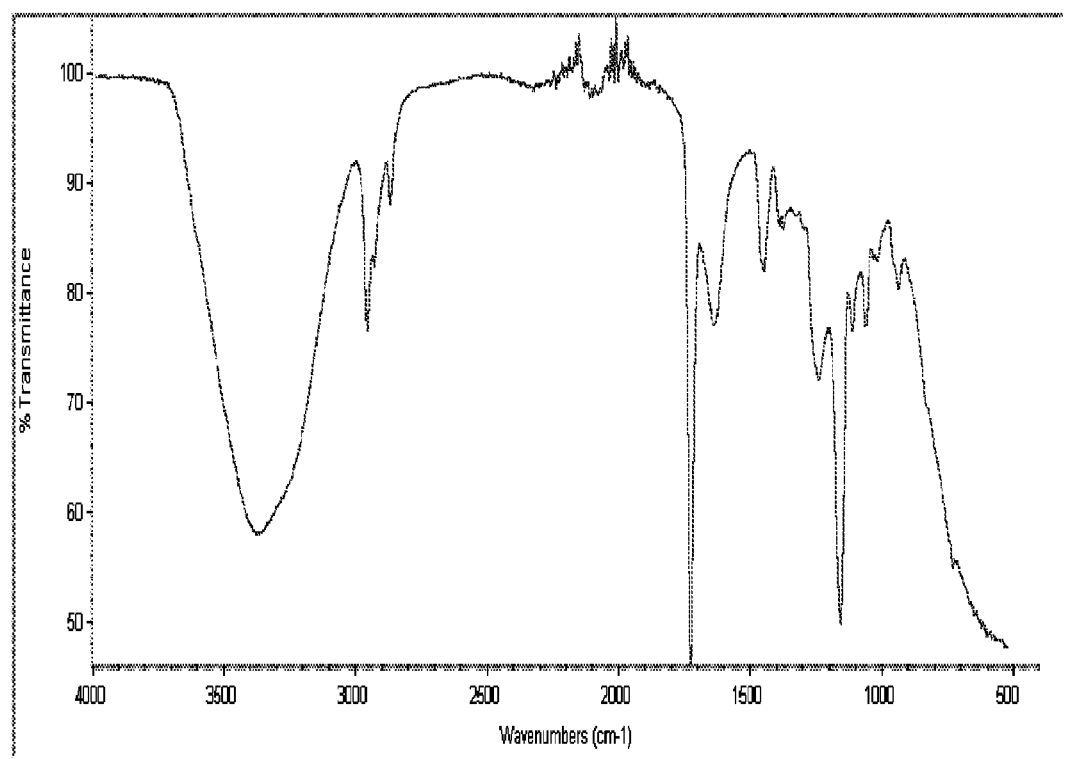
FIG. 11 shows the infrared spectrum for RHOPLEX 1950.
Figure 12:
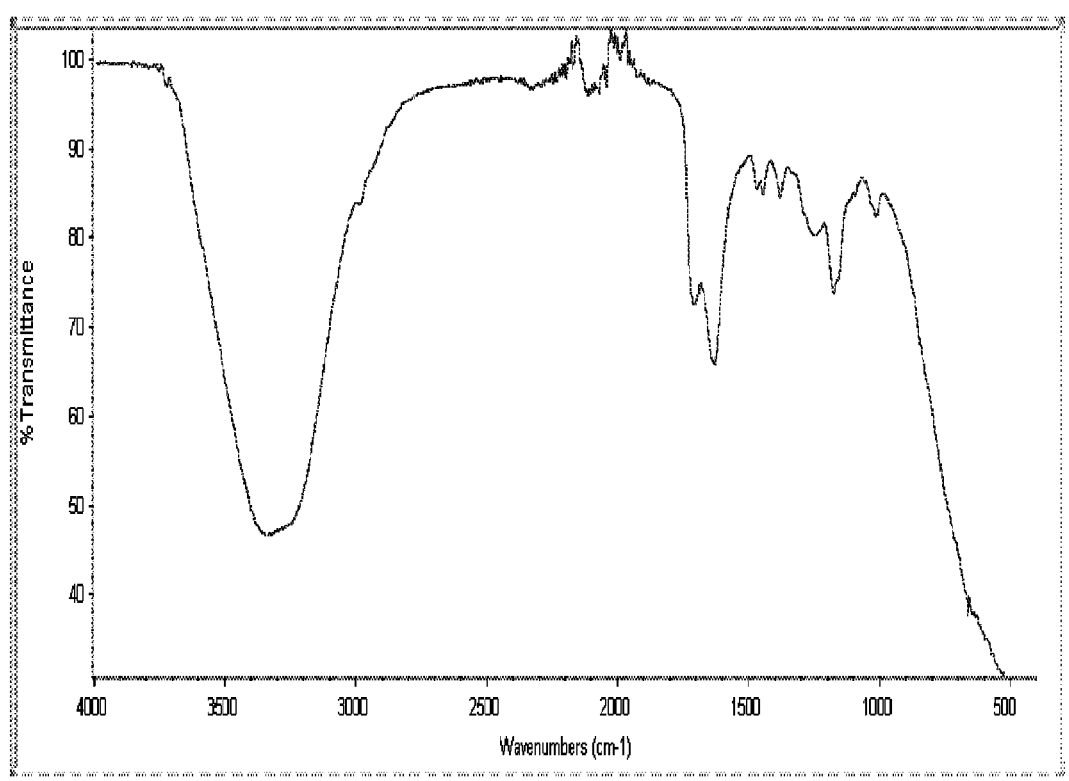
FIG. 12 shows the infrared spectrum for ACRYSOL ASE-60.
Figure 13:
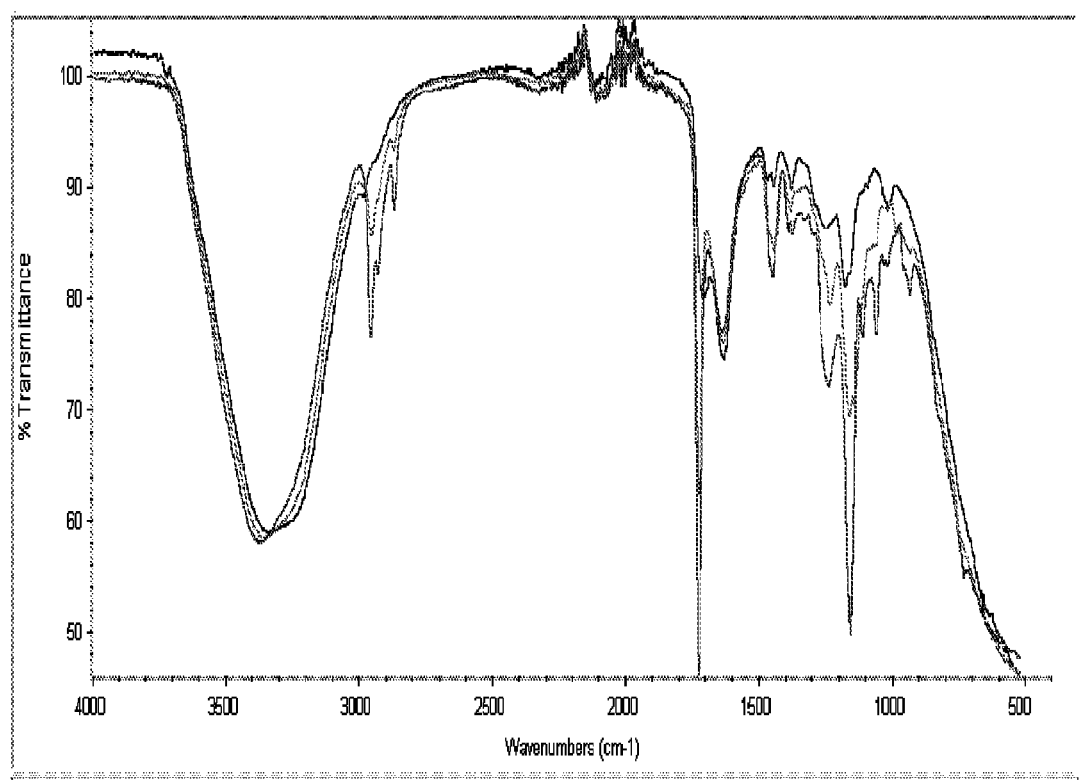
FIG. 13 shows the overlay of infrared spectra for RHOPLEX 1834, RHOPLEX 1950, and ACRYSOL ASE-60.

2. The method of claim 1, wherein the first conditioner acrylic polymer emulsion has an infrared spectrum substantially the same as that shown in FIG. 10, the first adhesive acrylic polymer emulsion has an infrared spectrum substantially the same as that shown in FIG. 10, the second adhesive acrylic polymer emulsion has an infrared spectrum substantially the same as that shown FIG. 11, and the third thickener acrylic anionic copolymer emulsion has an infrared spectrum substantially the same as that shown in FIG. 12.

3. The method of claim 1, wherein the condition composition comprises approximately 45 vol % of the first conditioner acrylic polymer emulsion, approximately 45 vol % water, and approximately 10 vol % isopropanol.

4. The method of claim 1, wherein the adhesive foundation comprises approximately 60 vol % of the first adhesive acrylic polymer emulsion, and approximately 40 vol % of the second adhesive acrylic polymer emulsion.

5. The method of claim 1, wherein the thickener composition comprises approximately 17 vol % of the third thickener acrylic anionic copolymer emulsion, and approximately 82 vol % of the water.

6. The method of claim 1, wherein the adhesive composition comprises approximately 80 to 85 vol % of the adhesive foundation, and approximately 15 to 20 vol % of the thickener composition.

7. The method of claim 1, wherein the conditioner composition and the adhesive composition are applied by injecting each into a gap between the first structure and the second structure.

8. The method of claim 1, wherein the first structure comprises plaster.

9. The method of claim 8, further comprising prior to applying the conditioner composition, creating ports in the plaster through which the conditioner composition and the adhesive composition are injected.

10. The method of claim 8, further comprising bringing the plaster toward the second structure such that the conditioner composition and the adhesive composition penetrate into both the plaster and the second structure.

11. The method of claim 10, wherein the plaster is brought toward the second structure before the injection of the adhesive composition.

12. The method of claim 10, wherein the plaster is brought toward the second structure after the injection of the adhesive composition.

13. The method of claim 10, further comprising temporarily maintaining the position of the plaster relative to the second structure.

14. The method of claim 13, wherein temporarily maintaining comprises passing screws through the plaster and into the second structure.

15. The method of claim 8, wherein the second structure comprises at least one lath.

16. The method of claim 1, wherein the adhesive composition is applied within 10 minutes after the application of the conditioner composition.

17. The method of claim 1, wherein the first structure comprises ceramic tile.

18. The method of claim 1, wherein the first structure comprises wood.

19. A method for adhering a first structure to a second structure, the method comprising:
    applying a conditioner composition to surfaces of the first structure and the second structure, the conditioner composition, comprising
        a first conditioner acrylic polymer emulsion having an infrared spectrum substantially the same as that shown in FIG. 10,
        water, and
        isopropanol; and
    applying an adhesive composition to the surfaces, the adhesive composition, comprising
        an adhesive foundation comprising a first adhesive acrylic polymer emulsion having an infrared spectrum substantially the same as that shown in FIG. 10; and a second adhesive acrylic polymer emulsion having an infrared spectrum substantially the same as that shown in FIG. 11,
        a thickener composition comprising a third thickener acrylic anionic copolymer emulsion having an infrared spectrum substantially the same as that shown in FIG. 12, and water; and
    allowing the surfaces to bond.

20. The method of claim 19, wherein the condition composition comprises approximately 45 vol % of the first conditioner acrylic polymer emulsion, approximately 45 vol % water, and approximately 10 vol % isopropanol.

21. The method of claim 19, wherein the adhesive foundation comprises approximately 60 vol % of the first adhesive acrylic polymer emulsion, and approximately 40 vol % of the second adhesive acrylic polymer emulsion.

22. The method of claim 19, wherein the thickener composition comprises approximately 17 vol % of the third thickener acrylic anionic copolymer emulsion, and approximately 82 vol % of the water.

23. The method of claim 19, wherein the adhesive composition comprises approximately 80 to 85 vol % of the adhesive foundation, and approximately 15 to 20 vol % of the thickener composition.

* * * * *